United States Patent
Fuller et al.

(10) Patent No.: US 9,909,671 B2
(45) Date of Patent: Mar. 6, 2018

(54) LOW LEAK PILOT OPERATED SPOOL VALVE

(71) Applicant: DunAn Microstaq, Inc., Austin, TX (US)

(72) Inventors: E. Nelson Fuller, Manchester, MI (US); Gengxun K. Gurley, Hutto, TX (US)

(73) Assignee: DUNAN MICROSTAQ, INC., Austin, TX (US)

( * ) Notice: Subject to any disclaimer, the term of this patent is extended or adjusted under 35 U.S.C. 154(b) by 0 days.

(21) Appl. No.: 15/191,567

(22) Filed: Jun. 24, 2016

(65) Prior Publication Data

US 2017/0002932 A1  Jan. 5, 2017

Related U.S. Application Data

(60) Provisional application No. 62/187,412, filed on Jul. 1, 2015.

(51) Int. Cl.
*F16K 1/46* (2006.01)
*F16K 99/00* (2006.01)
*F16K 31/124* (2006.01)

(52) U.S. Cl.
CPC ............ *F16K 1/46* (2013.01); *F16K 31/124* (2013.01); *F16K 99/0001* (2013.01); *F16K 2099/009* (2013.01)

(58) Field of Classification Search
USPC .................................................. 137/625.35
See application file for complete search history.

(56) References Cited

U.S. PATENT DOCUMENTS

| | | | | |
|---|---|---|---|---|
| 2,666,614 A | * | 1/1954 | Grove .................... | B60S 9/12 251/357 |
| 2,764,181 A | * | 9/1956 | Richolt .................. | F16K 41/04 137/625.37 |
| 3,136,336 A | * | 6/1964 | Priesmeyer ............. | F16K 3/28 137/625.18 |
| 3,458,769 A | * | 7/1969 | Stampfli ................ | F16K 31/082 137/625.64 |
| 4,257,573 A | * | 3/1981 | Stampfli ................ | F16K 31/40 137/625.64 |
| 4,381,099 A | * | 4/1983 | Knedlik ................ | B67D 1/1438 222/504 |
| 4,805,675 A | * | 2/1989 | Joseph .................. | B01J 4/001 137/625.17 |

(Continued)

*Primary Examiner* — John Fox
(74) *Attorney, Agent, or Firm* — MacMillan, Sobanski & Todd, LLC (57) ABSTRACT

A hybrid spool valve includes a body having a longitudinal bore. The bore has a fluid inlet chamber in fluid communication with a fluid inlet port and a fluid outlet chamber in fluid communication with a fluid outlet port. A spool is slidably mounted in the bore and is movable between a fully open position, a fully closed position, and a plurality of partially open positions. A pilot microvalve is mounted within the bore and is configured to control the sliding movement of the spool by varying the flow of fluid therethrough. A seal is disposed in a groove formed in an outside surface of the spool such that when the spool is in the fully closed position the seal engages a wall of the bore, and when the spool is the fully open position or one of the partially open positions the seal does not engage the bore.

18 Claims, 8 Drawing Sheets

(56) References Cited

U.S. PATENT DOCUMENTS

| | | |
|---|---|---|
| 6,523,560 B1 | 2/2003 | Williams et al. |
| 6,540,203 B1 | 4/2003 | Hunnicutt |
| 6,845,962 B1 | 1/2005 | Barron et al. |
| 7,156,365 B2 | 1/2007 | Fuller et al. |
| 7,380,571 B2 * | 6/2008 | Okamoto ............... F16J 15/104 |
| | | 137/625.63 |
| 8,387,659 B2 | 3/2013 | Hunnicutt |
| 8,905,067 B2 * | 12/2014 | Maichl ................ F16K 31/1221 |
| | | 137/554 |
| 2014/0374633 A1 | 12/2014 | Fuller et al. |

\* cited by examiner

LOW LEAK PILOT OPERATED SPOOL VALVE

CROSS-REFERENCE TO RELATED APPLICATIONS

This application claims the benefit of U.S. Provisional Application No. 62/187,412, filed Jul. 1, 2015, the disclosure of which is incorporated herein by reference.

BACKGROUND OF THE INVENTION

This invention relates in general to valves for controlling fluid flow in a hydraulic, pneumatic, or heating, ventilating, air conditioning, and refrigeration (HVAC/R) system. In particular, this invention relates to an improved hybrid spool valve assembly that reduces leakage in such a hydraulic, pneumatic, or HVAC/R system.

Valves are widely used for controlling the flow of fluid from a source of pressurized fluid to a load device or from a load device to a pressure vent. Frequently, a pump or other device is provided as the source of pressured fluid. The flow of the fluid may be selectively controlled by a valve to control the operation of the load device. One type of valve used to selectively control the flow of the fluid is a hybrid spool valve assembly that may include a macro-sized main spool valve that is driven by a pilot microvalve.

One known macro-sized main spool valve that is driven by a pilot microvalve is an expansion valve, such as a Modular Silicon Expansion Valve (MSEV). MSEVs are electronically controlled, normally closed, and single flow directional valves. MSEVs may be used for refrigerant mass flow control in conventional HVAC/R systems and other hydraulic or pneumatic systems.

The MSEV is a two-stage proportional control valve. The first stage is a microvalve that acts as a pilot valve to control a second stage spool valve. When the microvalve receives a Pulse Width Modulation (PWM) signal, the microvalve modulates fluid flow to change the pressure differential across the second stage spool valve. The spool valve will move to balance the pressure differential, effectively changing the size of the orifice opening of the MSEV to control the desired amount of refrigerant flow.

A microvalve is an example of a micro-electro-mechanical system. Generally speaking, a micro-electro-mechanical system is a system that not only includes both electrical and mechanical components, but is additionally physically small, typically including features having sizes in the range of ten micrometers or smaller. The term "micro-machining" is commonly understood to relate to the production of three-dimensional structures and moving parts of such micro-electro-mechanical system devices. In the past, micro-electro-mechanical systems used modified integrated circuit (e.g., computer chip) fabrication techniques (such as chemical etching) and materials (such as silicon semiconductor material), which were micro-machined to provide these very small electrical and mechanical components. More recently, however, other micro-machining techniques and materials have become available.

As used herein, the term "micro-machined device" means a device including features having sizes in the micrometer range or smaller and, thus, is at least partially formed by micro-machining. As also used herein, the term "microvalve" means a valve including features having sizes in the micrometer range or smaller and, thus, is also at least partially formed by micro-machining. Lastly, as used herein, the term "microvalve device" means a micro-machined device that includes not only a microvalve, but further includes additional components. It should be noted that if components other than a microvalve are included in the microvalve device, these other components may be either micro-machined components or standard-sized (i.e., larger) components. Similarly, a micro-machined device may include both micro-machined components and standard-sized components.

A variety of microvalve structures are known in the art for controlling the flow of fluid through a fluid circuit. One well known microvalve structure includes a displaceable member that is supported within a closed internal cavity provided in a valve body for pivoting, axial, or other movement between a closed position and an open position. When disposed in the closed position, the displaceable member substantially blocks a first fluid port that is otherwise in fluid communication with a second fluid port, thereby preventing fluid from flowing between the first and second fluid ports. When disposed in the open position, the displaceable member does not substantially block the first fluid port from fluid communication with the second fluid port, thereby permitting fluid to flow between the first and second fluid ports.

U.S. Pat. Nos. 6,523,560; 6,540,203; and 6,845,962, the disclosures of which are incorporated herein by reference, describe microvalves made of multiple layers of material. The multiple layers are micromachined and bonded together to form a microvalve body and the various microvalve components contained therein, including an intermediate mechanical layer containing the movable parts of the microvalve. U.S. Pat. No. 7,156,365, the disclosure of which is also incorporated herein by reference, describes a method of controlling the actuator of a microvalve. In the disclosed method, a controller supplies an initial voltage to the actuator which is effective to actuate the microvalve. Then, the controller provides a pulsed voltage to the actuator which is effective to continue the actuation of the microvalve.

It is known in the art that a spool valve driven by a pilot microvalve may experience at least some fluid leakage through the spool valve outlet even when the spool valve is closed or in a power off condition. Manufacturers of some fluid systems, such as refrigeration systems, require a lower level of leakage in the spool valve than may be provided by a conventional spool valve to prevent fluid from flowing back to the compressor. Often, refrigeration system manufacturers will add an additional valve, such as a solenoid valve to the refrigeration system to positively shut-off the flow of any fluid that may leak from a conventional spool valve. It would be desirable however, to provide an improved structure for a hybrid spool valve assembly that reduces or eliminates undesirable leakage of the fluid flowing therethrough without the need for an additional valve in the fluid system.

SUMMARY OF THE INVENTION

This invention relates to an improved structure for a hybrid spool valve that reduces undesirable leakage of the fluid flowing therethrough. The hybrid spool valve includes a body defining a longitudinally extending bore. The bore has a fluid inlet chamber in fluid communication with a fluid inlet port and a fluid outlet chamber in fluid communication with a fluid outlet port. A spool is slidably mounted in the bore and has a first and a second end. The spool is configured for sliding movement between a fully open position, which allows fluid flow from the fluid inlet chamber to the fluid outlet chamber, a fully closed position, which restricts fluid flow from the fluid inlet chamber to the fluid outlet chamber, and a plurality of partially open positions, which allows at least some fluid to flow from the fluid inlet chamber to the fluid outlet chamber. A pilot microvalve is mounted within the bore adjacent the first end of the spool and is configured to control the sliding movement of the spool by varying the flow of fluid therethrough. A seal is disposed in a groove formed in an outside surface of the spool. When the spool is in the fully closed position, the seal engages a wall of the bore. When the spool is in one of the fully open and partially open positions the seal does not engage the bore.

Various aspects of this invention will become apparent to those skilled in the art from the following detailed description of the preferred embodiment, when read in light of the accompanying drawings.

DETAILED DESCRIPTION OF THE PREFERRED EMBODIMENT

Referring now to the drawings, FIGS. 1 through 5 illustrate an improved hybrid spool valve indicated generally at 10 in accordance with this invention. The illustrated hybrid spool valve 10 includes a pilot microvalve 12 (see FIGS. 3 through 5) and an improved spool 14 that minimizes leakage. The pilot microvalve 12 may be any desired microvalve, such as the thermally actuated microvalve described in detail in U.S. Patent Application Publication No. 2014/0374633, the disclosure of which is incorporated herein by reference in its entirety.

Figure 1:
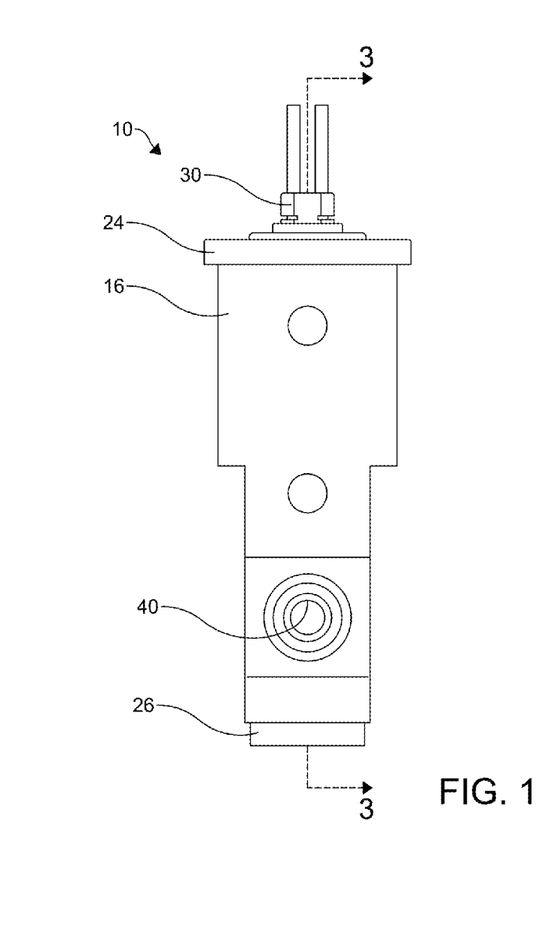
FIG. 1 is a front elevational view of an improved hybrid spool valve in accordance with this invention.
Figure 2:
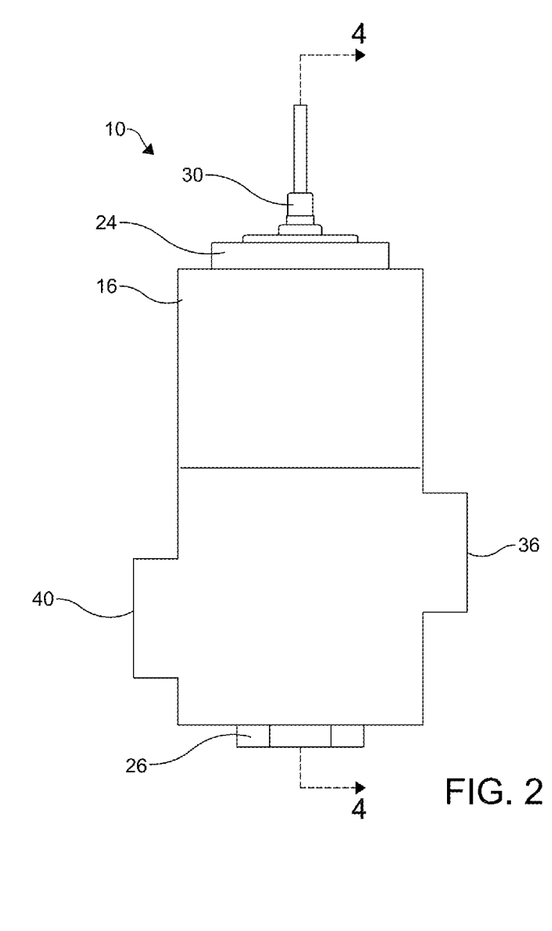
FIG. 2 is a side elevational view of the improved hybrid spool valve illustrated in FIG. 1.
Figure 3:
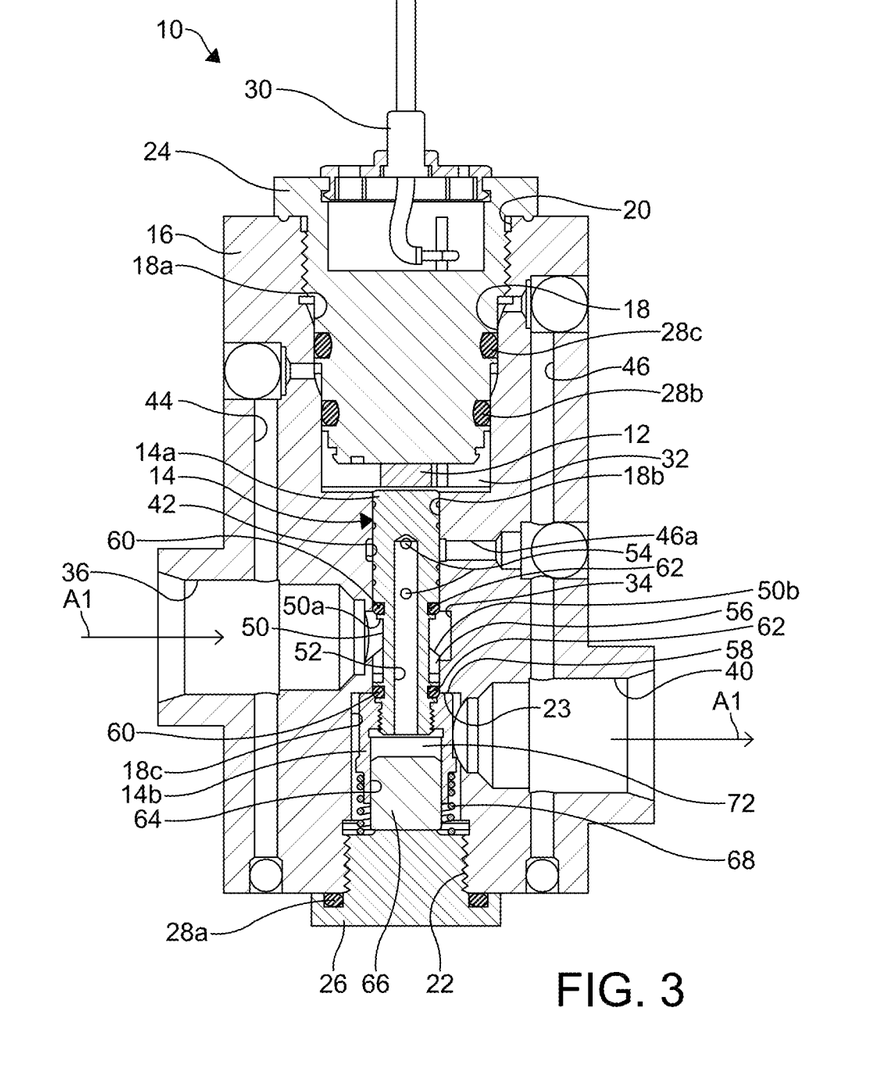
FIG. 3 is a cross-sectional view taken along the line 3-3 of FIG. 1 showing the spool valve in the closed position.
Figure 4:
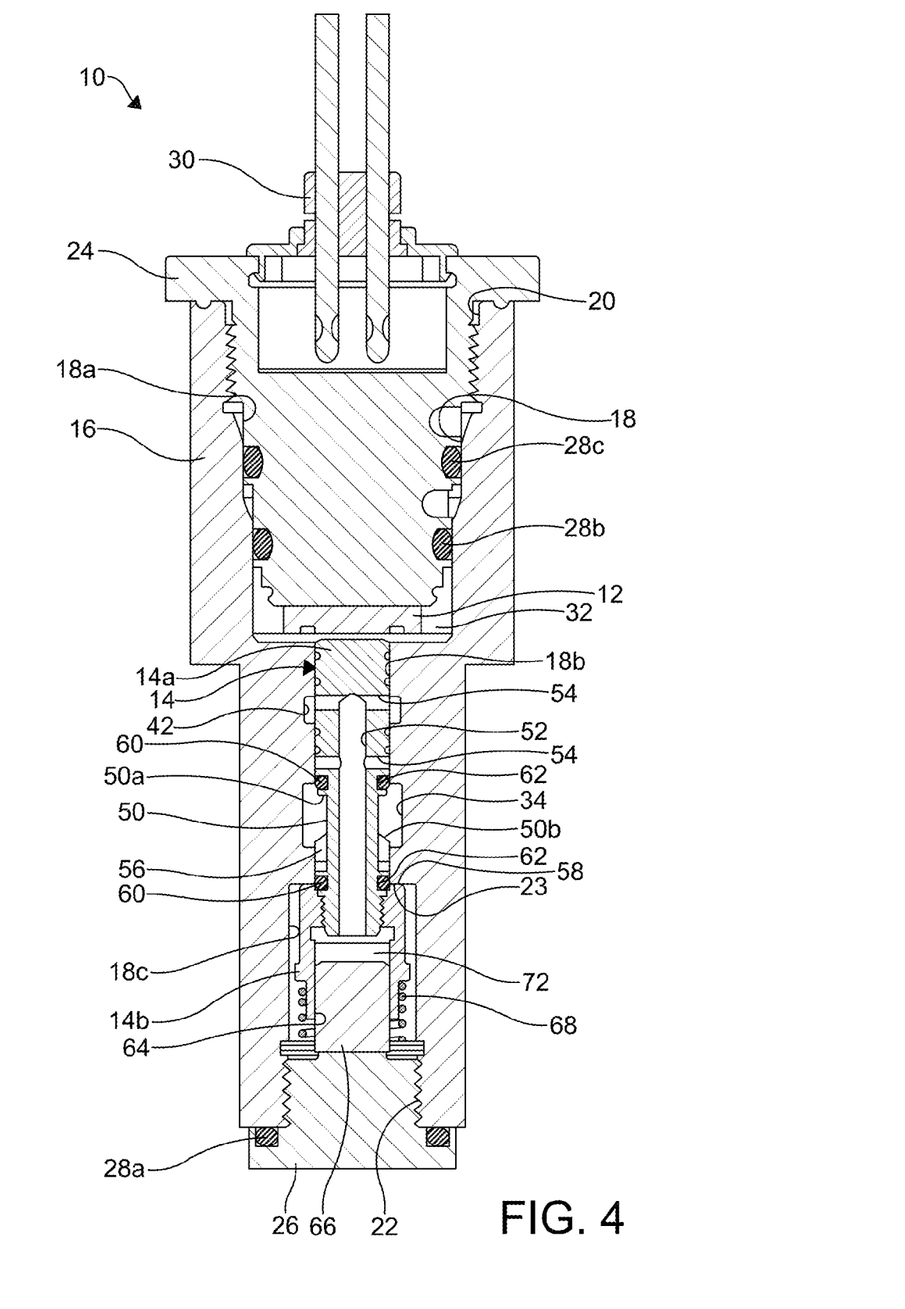
FIG. 4 is a cross-sectional view taken along the line 4-4 of FIG. 2 also showing the spool valve in a closed position.
Figure 5:
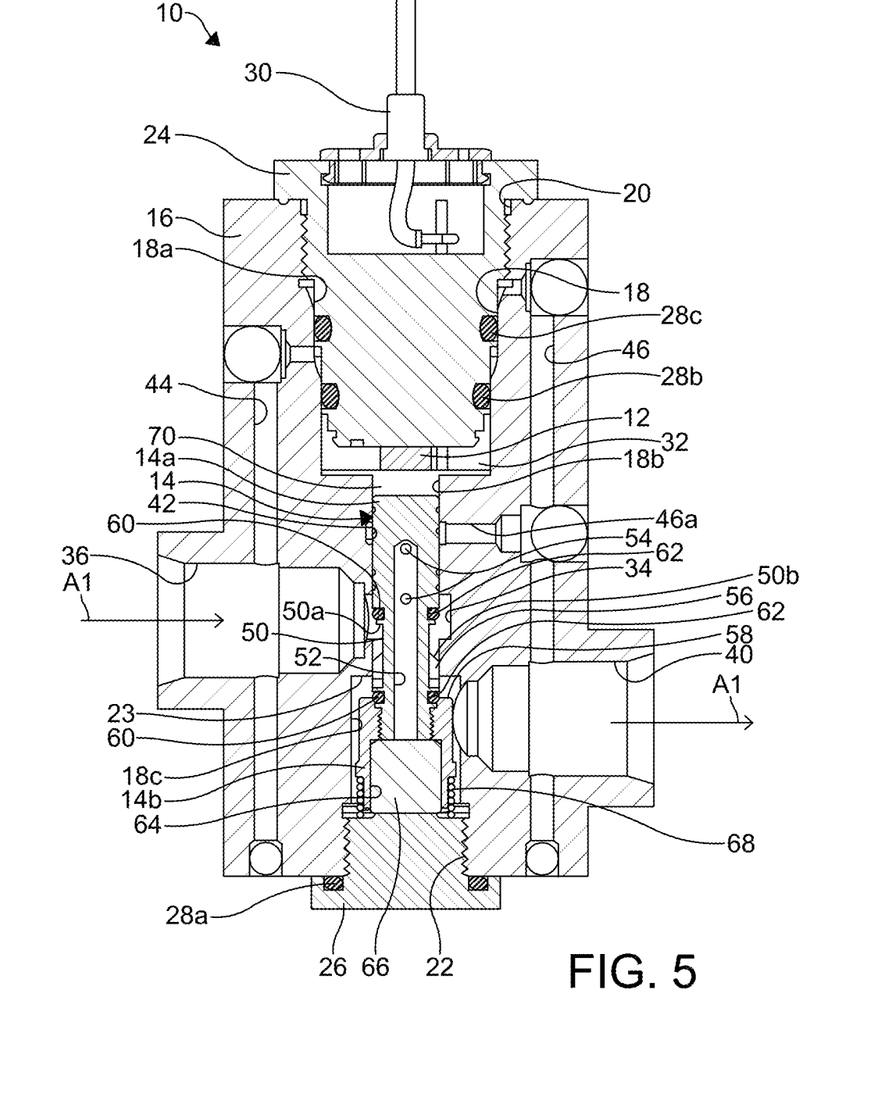
FIG. 5 is a cross-sectional view similar to FIG. 3 showing the spool valve in an open position.

As shown in FIGS. 1 through 5, the hybrid spool valve 10 includes a body 16 defining a longitudinally extending bore 18 having a first open end 20 (the upper end when viewing FIGS. 3 through 5) and a second open end 22 (the lower end when viewing FIGS. 3 through 5). The bore 18 includes a first portion 18a, a second portion 18b having a diameter smaller than the first portion 18a, and a third portion 18c having a diameter larger than the second portion 18b. A radially extending first shoulder is formed at a first end of the third portion 18c of the bore 18 (the upper end of the third portion 18c when viewing FIG. 2) and defines a first sealing surface 23. The first open end 20 may be closed by a suitable first plug 24, and the second open end 22 may be closed by a suitable second plug 26. The first and second plugs 24 and 26 may be sealingly fixed in their respective open ends 20 and 22 by any suitable method, such as by welding, press fitting, rolling, or as illustrated, held in place by a threaded connection, and made leak-tight by one or more seals or O-rings 28a, 28b, and 28c. An electrical connector 30 extends outwardly from an outside axial end of the first plug 24 and connects the microvalve 12 to a source of electrical power (not shown). The microvalve 12 is mounted to the first plug 24 within a cavity 32 defined by the first portion 18a of the bore 18 and an inside axial end of the first plug 24 (the lower end of the first plug 24 when viewing FIGS. 3 through 5).

The second portion 18b of the bore 18 includes a circumferentially extending first groove defining a fluid inlet chamber 34. The fluid inlet chamber 34 is in fluid communication with a source of fluid, such as a refrigeration system condenser (not shown) via a fluid inlet port 36. The third portion 18c of the bore 18 also defines a circumferentially extending fluid outlet chamber. The third portion 18c is in fluid communication with a fluid outlet port 40. The fluid outlet port 40 may be connected to a refrigeration system evaporator (not shown) in a conventional manner. Thus, fluid flows through the improved hybrid spool valve 10 in the direction of the arrows A1. A circumferentially extending second groove 42 is formed in the second portion 18b of the bore between the fluid inlet chamber 34 and the first portion 18a of the bore 18.

A first fluid passageway 44 is formed in the body 16 and extends longitudinally between the fluid inlet port 36 and the microvalve 12 via fluid flow conduits (not shown) formed in the first plug 24. Similarly, a second fluid passageway 46 is formed in the body 16 and extends longitudinally between the fluid outlet port 40 and the microvalve 12 via fluid flow conduits (not shown) formed in the first plug 24. A radially extending passageway 46a is also formed in the body 16 and is in fluid communication between the fluid pressure passageway 46 and the second groove 42. The first and second fluid passageways 44 and 46 supply fluid to the pilot microvalve 12.

The generally cylindrical spool 14 is a movable valve element that is slidably mounted in the second portion 18b of the longitudinally extending bore 18. The spool 14 has a first portion 14a disposed near the pilot microvalve 12 and a second portion 14b disposed near the second plug 26 at the second open end 22. The first portion 14a of the spool 14 includes a circumferentially extending fluid flow groove 50 formed in an outer surface thereof, and a longitudinally extending bore 52 formed therein. The fluid flow groove 50 includes a first axial end 50a (the upper end when viewing FIGS. 3 through 5) and a second axial end 50b (the lower end when viewing FIGS. 3 through 5). One or more radially extending feedback ports 54 are formed through the spool 14 and provide fluid communication between the longitudinally extending bore 52 and the second portion 18b of the bore 18 formed in the body 16.

A plurality of longitudinally extending fluid flow slots 56 are also formed in the outside surface of the spool 14 at the second axial end 50b of the fluid flow groove 50. In the illustrated embodiment, the fluid flow slots 56 have a width of about 1.5 mm, although the slots 56 may have any desired width.

In the illustrated embodiment, the first portion 14a of the spool 14 is slidably movable between a fully closed position, as shown in FIGS. 3 and 4, a fully open position, as shown in FIG. 5, and a plurality of partially open positions (not shown) wherein the first portion 14a of the spool 14 is positioned intermediate the fully closed and fully open positions. When the first portion 14a of the spool 14 is disposed in the fully closed position, the first portion 14a of the spool 14 substantially blocks the fluid inlet chamber 34 that is otherwise in fluid communication with the third portion 18c of the bore, thereby preventing fluid from flowing between the fluid inlet port 36 and the fluid outlet port 40. When the first portion 14a of the spool 14 is disposed in the fully open position or in one of the partially open positions, the first portion 14a of the spool 14 does not substantially block the fluid inlet chamber 34 from fluid communication with the third portion 18c of the bore, thereby permitting fluid to flow between the fluid inlet port 36 and the fluid outlet port 40.

In the fully closed position as shown in FIG. 3, one of the feedback ports 54 (the uppermost feedback port 54 when viewing FIG. 3) is in fluid communication with the second groove 42 and, therefore, in fluid communication with the second fluid passageway 46.

A radially extending second shoulder is formed at a first end of the second portion 14b of the spool 14 (the upper end of the second portion 14b when viewing FIGS. 3 through 5) and defines a second sealing surface 58. Additionally, seals, such as O-rings 60, are disposed in two circumferentially extending grooves 62 located on opposite sides of the fluid flow groove 50 formed in the outer surface of the first portion 14a of the spool 14.

The illustrated spool 14 is formed in the two portions 14a and 14b for ease of manufacture. Alternatively, and if desired, the spool 14 may be formed as a single piece. Further, the spool 14 may be formed without the grooves 62 and the associated O-rings 60, with only one groove 62 and one O-ring 60, or with more than two grooves 62 and the associated O-rings 60.

The second portion 14b of the spool 14 is generally cylindrical, has a longitudinally extending bore 64 therein, and is disposed within the third portion 18b of the bore 18. The first portion 14a is attached within the bore 64 at a first end of the second portion 14b (the upper end of the second portion 14b when viewing FIGS. 3 through 5) by a threaded connection. Alternatively, the first portion 14a may be attached to the second portion 14b by any desired method, such as by welding or press fitting. A generally cylindrical feedback piston 66 is slidably mounted in the bore 64 at a second end of the second portion 14b (the lower end of the second portion 14b when viewing FIGS. 3 through 5). A spring 68 extends between the second portion 14b and the second plug 26.

Figure 6:
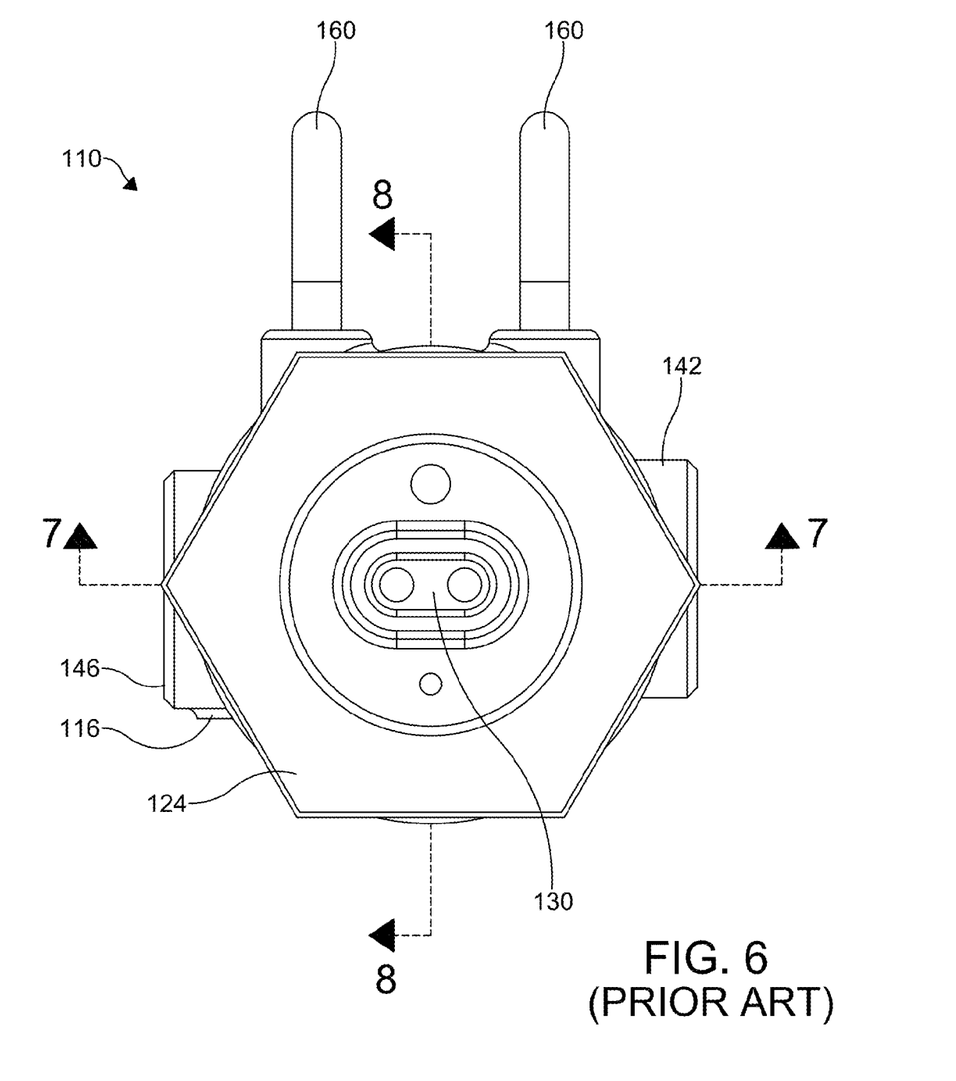
FIG. 6 is a top plan view of a prior art spool valve assembly.
Figure 7:
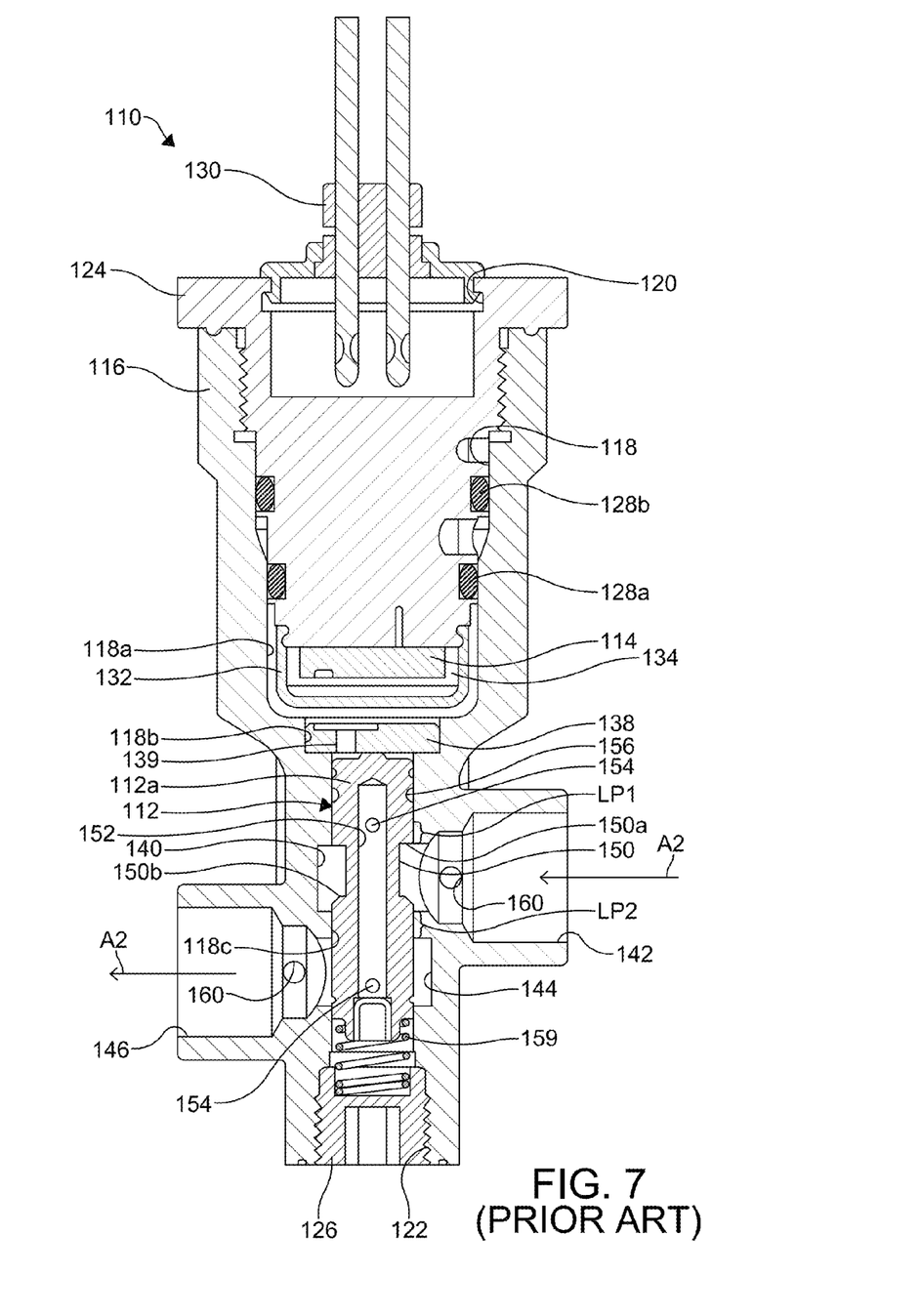
FIG. 7 is a cross-sectional view taken along the line 7-7 of FIG. 6.
Figure 8:
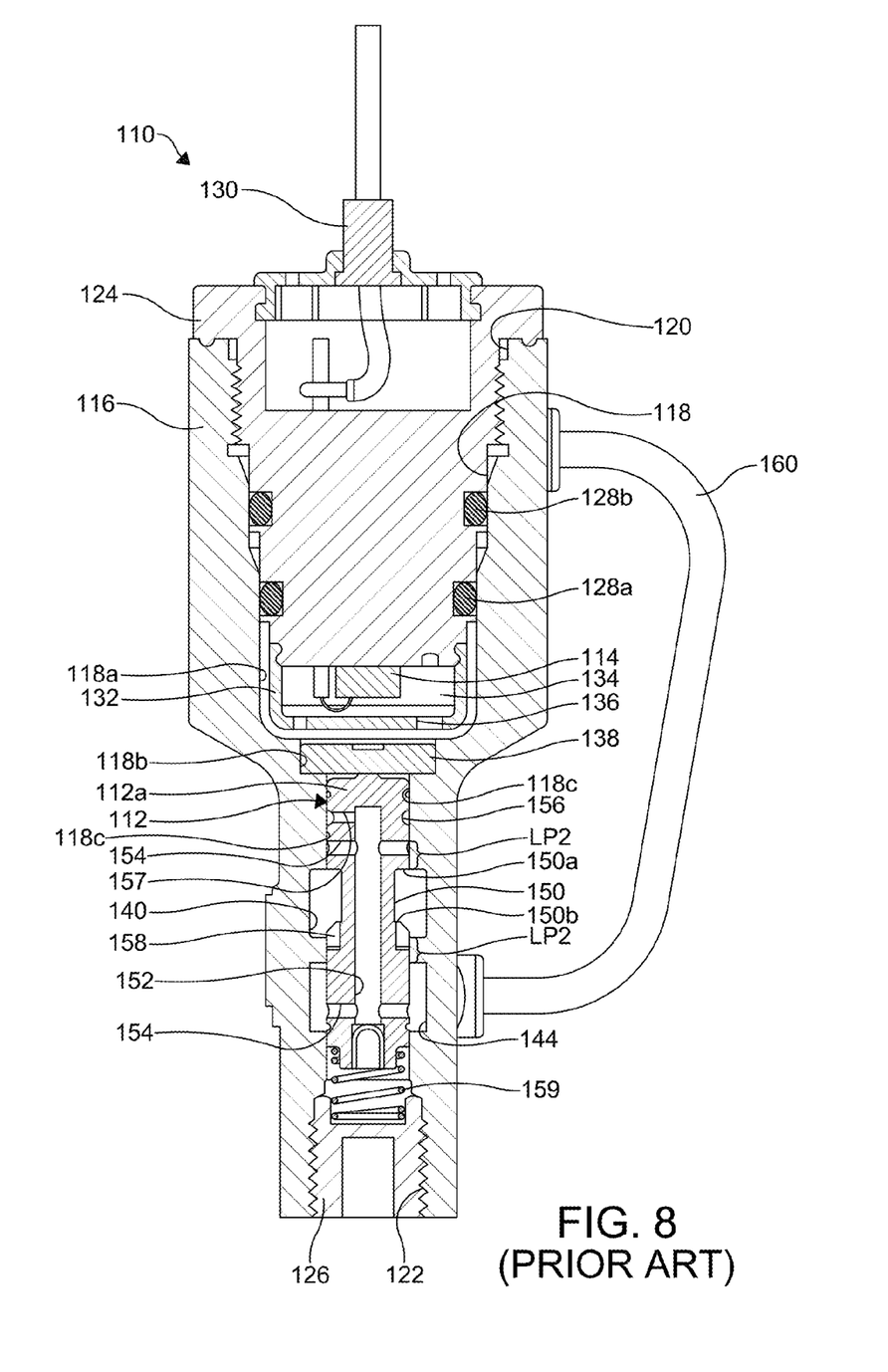
FIG. 8 is a cross-sectional view taken along the line 8-8 of FIG. 6.

Referring now to FIGS. 6 through 8, an embodiment of a known spool valve assembly is shown generally at 110. The known spool valve assembly 110 includes a macro-sized main spool valve 112 that is driven by a pilot microvalve 114. Additional embodiments of known spool valve assemblies are disclosed in U.S. Pat. No. 8,387,659 to Hunnicutt, the disclosure of which in incorporated herein in its entirety.

In operation, the main spool valve 112 follows the movement of the pilot microvalve 114, i.e., a change in the open-closed position of the pilot microvalve 114 is matched by a linearly equivalent change in the open-closed position of the spool valve 112. For example, if the pilot microvalve 114 is half-open, the spool valve 112 will be half-open. This is true regardless of pressure and flow conditions under which the known spool valve assembly 110 is operating.

The known main spool valve 112 is a normally closed valve. Alternatively, the main spool valve 112 may be a normally open valve, or a valve normally positioned intermediate a fully closed position and a fully open position. In FIGS. 7 and 8, the known main spool valve 112 is shown in a fully closed position.

The known main spool valve 112 is disposed in a valve body 116. The valve body 116 includes a variety of passageways and ports for connecting different portions of the known main spool valve assembly 110 to other portions of a fluid circuit (not shown) or with each other.

The valve body 116 includes a longitudinally extending bore 118 having a first open end 120 (the upper end when viewing FIGS. 7 and 8) and a second open end 122 (the lower end when viewing FIGS. 7 and 8). The bore 118 includes a first portion 118a (the upper portion when viewing FIGS. 7 and 8), a second portion 118b having a diameter smaller than the first portion 118a, and a third portion 118c having a diameter larger than the second portion 118b.

The first open end 120 may be closed by a suitable first plug 124, and the second open end 122 may be closed by a suitable second plug 126. The first and second plugs 124 and 126 are each sealingly fixed in their respective open ends 120 and 122 by a threaded connection. The first plug 124 may be made leak-tight by one or more seals or O-rings 128a and 128b. An electrical connector 130 extends outwardly from an outside axial end of the first plug 124 and connects the microvalve 114 to a source of electrical power (not shown).

A cup shaped cap 132 is attached to an inside axial end of the first plug 124 and defines a fluid cavity 134. At least one fluid port 136 (see FIG. 8) is formed through the cap 132. The microvalve 114 is mounted to the first plug 124 within the fluid cavity 134 defined by the cap 132. A closure member 138 is disposed in the second portion 118b of the bore 118 and includes a fluid passageway 139 (see FIG. 7) formed longitudinally therethrough.

The third portion 118c of the bore 118 includes a circumferentially extending first groove defining a fluid inlet chamber 140. The fluid inlet chamber 140 is connected to a source of fluid, such as a refrigeration system condenser (not shown) via an inlet port 142. The third portion 118c of the bore 118 also includes a circumferentially extending second groove defining a fluid outlet chamber 144. The fluid outlet chamber 144 is connected to an outlet port 146. The outlet port 146 may be connected to a refrigeration system evaporator (not shown) in a conventional manner. Thus, fluid flows through the spool valve assembly 110 in the direction of the arrows A2.

The generally cylindrical spool 112 is a movable valve element that is disposed in the third portion 118c of the longitudinally extending bore 118. The spool 112 includes a circumferentially extending fluid flow groove 150 formed in an outer surface thereof, and a longitudinally extending bore 152 formed therein. The fluid flow groove 150 includes a first axial end 150a (the upper end when viewing FIGS. 7 and 8) and a second axial end 150b (the lower end when viewing FIGS. 7 and 8). One or more radially extending feedback ports 154 are formed through the spool 112 and provide fluid communication between the longitudinally extending bore 152 and the third portion 118c of the bore 118 formed in the valve body 116.

A circumferentially extending pressure groove 156 is formed in the outside surface of the spool 112 between a first axial end 112a of the spool 112 and the fluid flow groove 150 and includes a radially extending passageway 157 (see FIG. 8). A plurality of longitudinally extending fluid flow slots 158 (see FIG. 8) are also formed in the outside surface of the spool 112 at the second axial end 150b of the fluid flow groove 150. In the illustrated embodiment, the fluid flow slots 158 have a width of about 1.5 mm, although the slots 158 may have any desired width. A spring 159 extends between the second plug 126 and the spool 112.

Capillary tubes 160 extend between the inlet and outlet ports 142 and 146, respectively, and fluid flow conduits (not shown) formed in the first plug 124. These fluid flow conduits supply fluid to the pilot microvalve 114.

In operation, the known spool valve assembly 110 may experience fluid leakage even when in a closed or power off condition. For example, pressurized fluid in the fluid inlet chamber 140 may travel along a first leak path LP1 between the spool 112 and the third portion 118c of the bore 118 and into the fluid outlet chamber 144 through one of feedback ports 154 (the uppermost feedback port when viewing FIGS. 7 and 8) and the bore 152. Pressurized fluid in the fluid inlet chamber 140 may also travel along a second leak path LP2 between the spool 112 and the third portion 118c of the bore 118 and into the fluid outlet chamber 144 through a second one of feedback ports 154 (the lowermost feedback port when viewing FIGS. 7 and 8) and the bore 152. Pressurized fluid traveling along the second leak path LP2 may also enter the fluid outlet chamber 144 directly as it travels between the spool 112 and the third portion 118c of the bore 118.

Referring back to FIGS. 3 and 4, when the spool 14 is in a fully closed position, e.g., during a power off condition of the hybrid spool valve 10, a space defining a feedback pressure chamber 72 is formed between the feedback piston 66 and the first portion 14a of the spool 14 within the bore 64. When the spool 14 is in the fully open position as shown in FIG. 5, the first portion 14a of the spool 14 is seated on the feedback piston 66 and a space defining a control pressure chamber 70 is formed within the second portion 18b of the longitudinally extending bore 18 between the first portion 14a of the spool 14 and the pilot microvalve 12.

Figure 9:
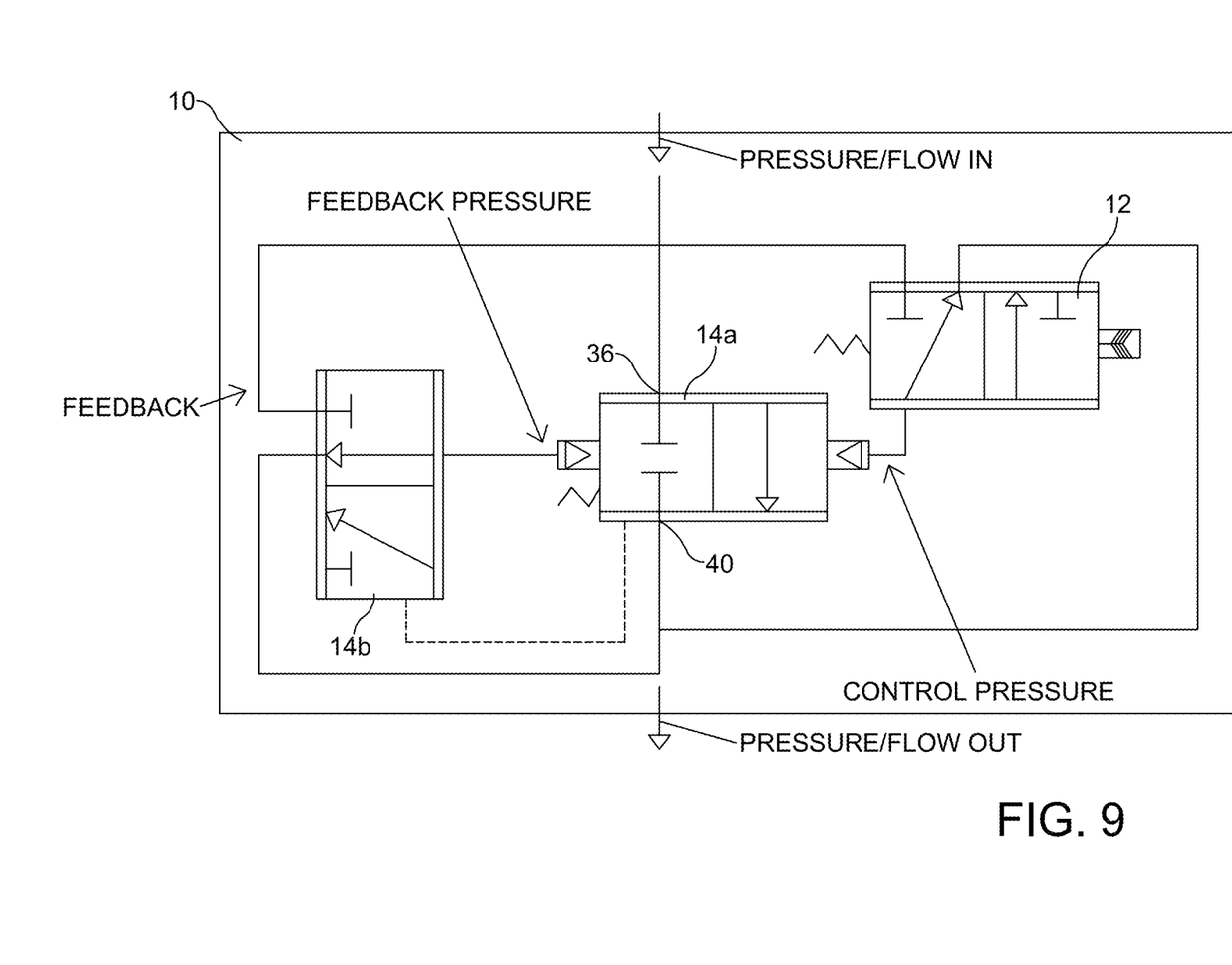
FIG. 9 is a schematic illustration of the operation of the improved hybrid spool valve illustrated in FIGS. 1 through 5.

The hybrid spool valve 10 operates in a manner similar to the known spool valve assembly 110 shown in FIGS. 6 through 8. As shown in FIG. 9, control pressure in the hybrid spool valve 10 is determined by the flow of fluid through the electronically actuated pilot microvalve 12. The spool 14 is moved by the control pressure provided by the fluid flowing through the microvalve 12. Movement of the spool 14 (downward when viewing FIGS. 3 through 5) then opens the feedback ports 54 to fluid flow from the fluid inlet port 36 to the fluid outlet port 40. Movement of the spool 14 is stopped when the fluid moving through the feedback ports 54 creates feedback pressure in the feedback pressure chamber 72 that, with the spring 68, balances the control pressure in the control pressure chamber 70.

It is desirable to reduce or prevent fluid leakage between the fluid inlet port 36 and the fluid outlet port 40 when the hybrid spool valve 10 is in the fully closed position shown in FIGS. 3 and 4. Advantageously, the O-rings 60 create seals between the spool 14 and the second portion 18b of the bore 18 on opposite sides of the fluid inlet chamber 34, thus minimizing fluid leakage from the fluid inlet chamber 34 into the third portion 18c of the bore and the fluid outlet port 40 when the spool 14 is in the fully closed position.

Additionally, in the fully closed position shown in FIGS. 3 and 4, the second sealing surface 58 of the spool 14 engages the first sealing surface 23 of the bore 18, creating an additional seal between the spool 14 and the bore 18, further minimizing fluid leakage into the third portion 18c of the bore and the fluid outlet port 40 when the spool 14 is in the fully closed position. The combination of the seal defined by the sealing surfaces 23 and 58, and the seals provided by the O-rings 60, significantly reduces leakage into the third portion 18c of the bore and the fluid outlet port 40 when the spool 14 is in the fully closed position.

When the hybrid spool valve 10 is in the open position as shown in FIG. 5, the O-rings 60 are not in contact with the second portion 18b of the bore 18 and, thus, do not provide a seal. Rather, when the hybrid spool valve 10 is in the open position, one of the O-rings 60 (the uppermost O-ring 60 when viewing FIG. 5) is disposed in the fluid inlet chamber 34, and the second one of the O-rings 60 (the lowermost O-ring 60 when viewing FIG. 5) is disposed in the third portion 18c of the bore. When the hybrid spool valve 10 is in the fully open position or in any of the plurality partially open positions, fluid is permitted to flow between the fluid inlet port 36 and the fluid outlet port 40, and the fluid leakage described above does not have a negative effect on the fluid system within which the hybrid spool valve 10 is installed and operates.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A hybrid spool valve comprising:
   a body defining a longitudinally extending bore, the bore having a fluid inlet chamber in fluid communication with a fluid inlet port and a fluid outlet chamber in fluid communication with a fluid outlet port;
   a spool slidably mounted in the bore and having a first and a second end, the spool configured for sliding movement between a fully open position, which allows fluid flow from the fluid inlet chamber to the fluid outlet chamber, a fully closed position, which restricts fluid flow from the fluid inlet chamber to the fluid outlet chamber, and a plurality of partially open positions, which allows at least some fluid to flow from the fluid inlet chamber to the fluid outlet chamber, the spool including:
   a longitudinally extending spool bore formed therein;
   a radially extending feedback port extending between an outside surface of the spool and the spool bore, the feedback port in fluid communication between the bore of the body and the spool bore;
   a fluid flow groove formed in the outside surface of the spool, the fluid flow groove in fluid communication between the fluid inlet chamber and the fluid outlet chamber when the spool is in one of the fully open and partially open positions; and
   a plurality of longitudinally extending fluid flow slots formed in an outside surface thereof and extending from an axial end of the fluid flow groove;
   a pilot microvalve mounted within the bore adjacent the first end of the spool and configured to control the sliding movement of the spool by varying the flow of fluid therethrough; and
   a seal disposed in a groove formed in an outside surface of the spool, wherein when the spool is in the fully closed position, the seal engages a wall of the bore, and wherein when the spool is in one of the fully open and partially open positions, the seal does not engage the bore.

2. The hybrid spool valve according to claim 1, wherein the seal is a first seal disposed in a first groove, and wherein the leak path is a first leak path, the hybrid spool valve further including a second a seal disposed in a second groove formed in an outside surface of the spool, the second groove formed between the first end of the spool and the plurality of longitudinally extending fluid flow slots, wherein when the spool is in the fully closed position the second seal engages a wall of the bore and seals a second leak path defined between the fluid inlet chamber, a space between the spool and the bore of the body, the feedback port, the spool bore, and the fluid outlet chamber, and wherein when the spool is in one of the fully open and partially open positions the second seal does not engage the bore.

3. The hybrid spool valve according to claim 2, wherein when the spool is in the fully closed position and the first seal engages the wall of the bore, the first seal further seals a third leak path defined between the fluid inlet chamber, the plurality of longitudinally extending fluid flow slots, and the fluid outlet chamber.

4. The hybrid spool valve according to claim 3, wherein the bore of the body includes a first shoulder formed therein between a first diameter portion and a second diameter portion thereof, wherein the spool includes a second shoulder formed on an outside surface thereof between a first diameter portion and a second diameter portion, and wherein in the fully closed position, the second shoulder on the spool sealingly engages the first shoulder in the bore of the body, thereby defining a mechanical seal within the bore between the fluid inlet chamber and the fluid outlet chamber, such that when the spool is in the fully closed position the mechanical seal seals the leak path between the fluid inlet chamber and the fluid outlet chamber.

5. The hybrid spool valve according to claim 1, wherein the bore of the body includes a first shoulder formed therein between a first diameter portion and a second diameter portion thereof, wherein the spool includes a second shoulder formed on an outside surface thereof between a first diameter portion and a second diameter portion, and wherein in the fully closed position, the second shoulder on the spool sealingly engages the first shoulder in the bore of the body, thereby defining a mechanical seal within the bore between the fluid inlet chamber and the fluid outlet chamber, such that when the spool is in the fully closed position the mechanical seal seals the leak path between the fluid inlet chamber and the fluid outlet chamber.

6. The hybrid spool valve according to claim 1, wherein the spool further includes:
   a generally cylindrical first portion disposed near the pilot microvalve;
   a generally cylindrical second portion, wherein the second portion has a longitudinally extending bore formed therein, and wherein the first portion of the spool is attached within the bore of the second portion; and
   a generally cylindrical feedback piston slidably mounted in the bore of the second portion.

7. The hybrid spool valve according to claim 6, wherein the first portion of the spool further includes:
   a longitudinally extending spool bore formed therein;
   a radially extending feedback port extending between an outside surface of the first portion and the spool bore, the feedback port in fluid communication between the bore of the body and the spool bore;
   a fluid flow groove formed in the outside surface of the first portion, the fluid flow groove in fluid communication between the fluid inlet chamber and the fluid outlet chamber when the spool is in one of the fully open and partially open positions; and
   a plurality of longitudinally extending fluid flow slots formed in an outside surface thereof and extending from an axial end of the fluid flow groove.

8. The hybrid spool valve according to claim 7, wherein first portion includes a plurality of feedback ports.

9. The hybrid spool valve according to claim 1, wherein the fluid flow groove has a first axial end and a second axial end, and wherein the plurality of longitudinally extending fluid flow slots are formed at the second axial end.

10. A hybrid spool valve comprising:
   a body defining a longitudinally extending bore, the bore having a fluid inlet chamber in fluid communication with a fluid inlet port and a fluid outlet chamber in fluid communication with a fluid outlet port;
   a spool slidably mounted in the bore and having a first and a second end, the spool configured for sliding movement between a fully open position, which allows fluid flow from the fluid inlet chamber to the fluid outlet chamber, a fully closed position, which restricts fluid flow from the fluid inlet chamber to the fluid outlet chamber, and a plurality of partially open positions, which allows at least some fluid to flow from the fluid inlet chamber to the fluid outlet chamber, the spool including:
      a longitudinally extending spool bore formed therein;
      a radially extending feedback port extending between an outside surface of the spool and the spool bore, the feedback port in fluid communication between the bore of the body and the spool bore;
      a fluid flow groove formed in the outside surface of the spool, the fluid flow groove in fluid communication between the fluid inlet chamber and the fluid outlet chamber when the spool is in one of the fully open and partially open positions; and
      a plurality of longitudinally extending fluid flow slots formed in an outside surface thereof and extending from an axial end of the fluid flow groove;
   a pilot microvalve mounted within the bore adjacent the first end of the spool and configured to control the sliding movement of the spool by varying the flow of fluid therethrough;
   a first shoulder formed in the bore of the body between a first diameter portion and a second diameter portion of the bore; and
   a second shoulder formed on an outside surface of the spool between a first diameter portion and a second diameter portion of the spool, wherein in the fully closed position, the second shoulder on the spool sealingly engages the first shoulder in the bore of the body, thereby defining a mechanical seal within the bore of the body between the fluid inlet chamber and the fluid outlet chamber, such that when the spool is in the fully closed position the mechanical seal seals a leak path between the fluid inlet chamber and the fluid outlet chamber.

11. The hybrid spool valve according to claim 10, wherein the spool further includes:
   a generally cylindrical first portion disposed near the pilot microvalve;
   a generally cylindrical second portion, wherein the second portion has a longitudinally extending bore formed therein, and wherein the first portion of the spool is attached within the bore of the second portion; and
   a generally cylindrical feedback piston slidably mounted in the bore of the second portion.

12. The hybrid spool valve according to claim 11, wherein the first portion of the spool further includes:
   a longitudinally extending spool bore formed therein;
   a radially extending feedback port extending between an outside surface of the first portion and the spool bore, the feedback port in fluid communication between the bore of the body and the spool bore;
   a fluid flow groove formed in the outside surface of the first portion, the fluid flow groove in fluid communication between the fluid inlet chamber and the fluid outlet chamber when the spool is in one of the fully open and partially open positions; and a plurality of longitudinally extending fluid flow slots formed in an outside surface thereof and extending from an axial end of the fluid flow groove.

13. The hybrid spool valve according to claim 10, further including:
a first seal disposed in a first groove formed in an outside surface of the spool, wherein when the spool is in the fully closed position the seal engages a wall of the bore and seals a first leak path defined between the fluid inlet chamber and the fluid outlet chamber, and wherein when the spool is in one of the fully open and partially open positions the seal does not engage the bore; and
a second a seal disposed in a second groove formed in an outside surface of the spool, the second groove formed between the second end of the spool and the plurality of longitudinally extending fluid flow slots, wherein when the spool is in the fully closed position the second seal engages a wall of the bore and seals a second leak path defined between the fluid inlet chamber, a space between the spool and the bore of the body, the feedback port, the spool bore, and the fluid outlet chamber, and wherein when the spool is in one of the fully open and partially open positions the second seal does not engage the bore;
wherein when the spool is in the fully closed position and the second seal engages the wall of the bore, the second seal further seals a third leak path defined between the fluid inlet chamber, the plurality of longitudinally extending fluid flow slots, and the fluid outlet chamber.

14. A hybrid spool valve comprising:
a body defining a longitudinally extending bore, the bore having a fluid inlet chamber in fluid communication with a fluid inlet port and a fluid outlet chamber in fluid communication with a fluid outlet port;
a spool slidably mounted in the bore and configured for sliding movement between a fully open position, which allows fluid flow from the fluid inlet chamber to the fluid outlet chamber, a fully closed position, which restricts fluid flow from the fluid inlet chamber to the fluid outlet chamber, and a plurality of partially open positions, which allows at least some fluid to flow from the fluid inlet chamber to the fluid outlet chamber, the spool having:
first and second ends;
a longitudinally extending spool bore formed therein;
a radially extending feedback port extending between an outside surface of the spool and the spool bore, the feedback port in fluid communication between the bore of the body and the spool bore;
a fluid flow groove formed in the outside surface of the spool, the fluid flow groove in fluid communication between the fluid inlet chamber and the fluid outlet chamber when the spool is in one of the fully open and partially open positions; and
a plurality of longitudinally extending fluid flow slots formed in an outside surface thereof and extending from an axial end of the fluid flow groove;

a pilot microvalve mounted within the bore adjacent the first end of the spool and configured to control the sliding movement of the spool by varying the flow of fluid therethrough;
a first seal disposed in a first groove formed in an outside surface of the spool, wherein when the spool is in the fully closed position the first seal engages a wall of the bore and seals a first leak path between the fluid inlet chamber and the fluid outlet chamber, and wherein when the spool is in one of the fully open and partially open positions the seal does not engage the bore; and
a second seal disposed in a second groove formed in an outside surface of the spool, the second groove formed between the second end of the spool and the plurality of longitudinally extending fluid flow slots, wherein when the spool is in the fully closed position the second seal engages a wall of the bore and seals a second leak path defined between the fluid inlet chamber, a space between the spool and the bore of the body, the feedback port, the spool bore, and the fluid outlet chamber, wherein when the spool is in one of the fully open and partially open positions the second seal does not engage the bore, and wherein when the spool is in the fully closed position and the second seal engages the wall of the bore, the second seal further seals a third leak path defined between the fluid inlet chamber, the plurality of longitudinally extending fluid flow slots, and the fluid outlet chamber.

15. The hybrid spool valve according to claim 14, wherein the bore of the body includes a first shoulder formed therein between a first diameter portion and a second diameter portion thereof, wherein the spool includes a second shoulder formed on an outside surface thereof between a first diameter portion and a second diameter portion, and wherein in the fully closed position, the second shoulder on the spool sealingly engages the first shoulder in the bore of the body, thereby defining a mechanical seal within the bore between the fluid inlet chamber and the fluid outlet chamber, such that when the spool is in the fully closed position the mechanical seal seals the leak path between the fluid inlet chamber and the fluid outlet chamber.

16. The hybrid spool valve according to claim 14, wherein the spool further includes:
a generally cylindrical first portion disposed near the pilot microvalve;
a generally cylindrical second portion, wherein the second portion has a longitudinally extending bore formed therein, and wherein the first portion of the spool is attached within the bore of the second portion; and
a generally cylindrical feedback piston slidably mounted in the bore of the second portion.

17. The hybrid spool valve according to claim 16, wherein the longitudinally extending spool bore and the radially extending feedback port are formed in the first portion of the spool.

18. The hybrid spool valve according to claim 17, wherein the first portion of the spool includes a plurality of radially extending feedback ports.

\* \* \* \* \*